United States Patent

[11] 3,623,584

[72] Inventor Charles L. Hill
 Olney, Ill.
[21] Appl. No. 63,389
[22] Filed Aug. 13, 1970
[45] Patented Nov. 30, 1971
[73] Assignee Cash Baron Corp.
 Olney, Ill.

[54] TORQUE CONVERTER TRANSMISSIONS
 7 Claims, 3 Drawing Figs.
[52] U.S. Cl. .................................................. 192/56 F,
 192/61
[51] Int. Cl. .......................................................F16d 31/04,
 F16d 31/08
[50] Field of Search............................................. 192/56 F,
 61

[56] References Cited
 UNITED STATES PATENTS
 2,730,218 1/1956 Wickman ..................... 192/61
 2,764,903 10/1956 Miller............................ 192/61 X FOREIGN PATENTS
254,977 10/1927 Italy ............................. 192/61

Primary Examiner—Allan D. Herrmann
Attorney—Dos T. Hatfield

ABSTRACT: A torque converter transmission comprising input and output shafts with a primary gear connected for rotation with the input shaft and a torque plate connected through a calibrated torque spring to a driven member connected to the output shaft. One or more fluid pump gear means are rotatably mounted on the torque plate and meshed with the primary gear to cause the torque plate to rotate with the primary gear when the pump gear is restrained from rotation. The torque spring permits limited relative rotation between the torque plate and the driven member and such rotation controls the restriction in the hydraulic circuit between the outlet port of the pump means and a reservoir of hydraulic fluid so that for a predetermined maximum input torque, the pump gear is restrained from rotation. A movable control valve plate is interposed in the outlet restriction to adjustably control the outlet restriction for a given relative rotation of the torque plate and driven member, thus controllably predetermining the maximum input torque for direct transmission between input and output shafts.

PATENTED NOV 30 1971 3,623,584

TORQUE CONVERTER TRANSMISSIONS

BACKGROUND OF THE INVENTION

Small and inexpensive torque converter transmissions of the general gear pump type to which this invention relates are well known and are used in a variety of applications, including bicycle and motor bike drives and the like. It may be desirable in many applications to be able to variably control the maximum amount of input torque that may be transmitted with a direct drive and without gear reduction and consequent torque multiplication but such control should be simple, reliable and inexpensive.

SUMMARY

In accordance with the invention, a gear pump torque converter transmission is provided with a control valve plate to variably control and predetermine the maximum amount of input torque that may be transmitted with a direct drive between input and output shafts and without gear reduction and consequent torque multiplication. This invention also provides a pneumatic member in the hydraulic reservoir to develop a predetermined hydraulic pressure for the fluid to be pumped by the gear pump means of the torque converter. A feature of the invention is the simple and compact assembly obtained by having the input and output shafts aligned with the fluid reservoir enclosed in the driven member and located axially adjacent the gearing connected to the input shaft.

Other features and advantages of the invention will be apparent with reference to the following specification and drawing.

DESCRIPTION OF THE PREFERRED EMBODIMENT

Figure 1:
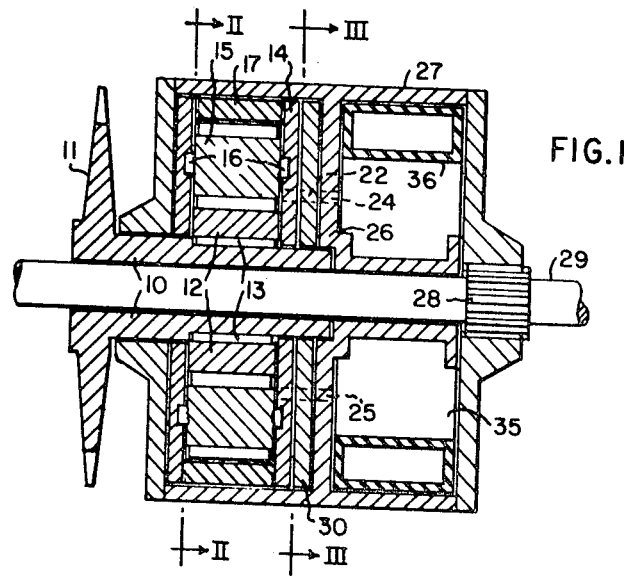
FIG. 1 is a fragmentary section along the axes of the input and output shafts.
Figure 2:
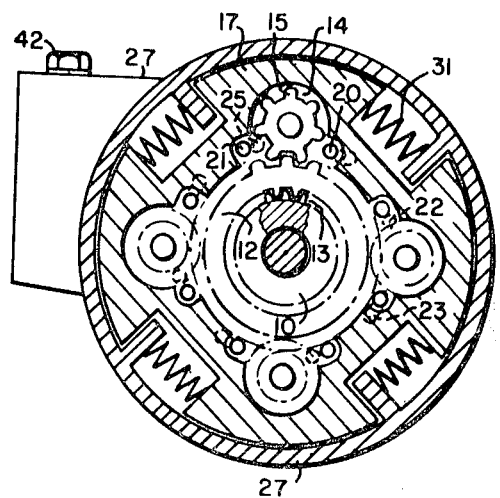
FIG. 2 is a section on the line 2—2 of FIG. 1.
Figure 3:
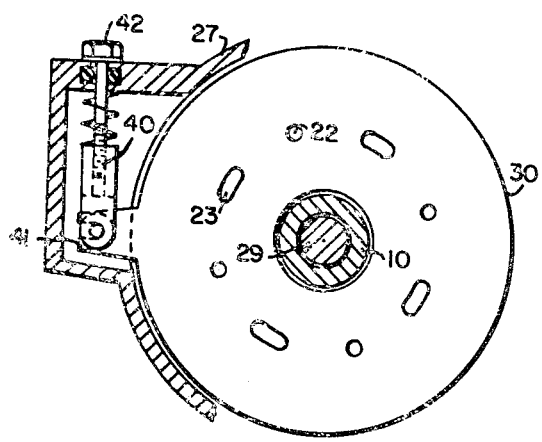
FIG. 3 is a section on the line 3—3 of FIG. 1.

Referring to the drawing, the input shaft 10 is provided with a driving gear sprocket 11, although it should be understood that the input shaft may be driven by any suitable means other than a gear sprocket. A primary gear 12 is connected by splines 13 or the like to be rotated with the input shaft 10. A torque responsive plate 14 is rotatably mounted to be concentric about the input shaft 10 and at least one gear pump pinion, such as shown at 15, is rotatably journaled at 16 on the torque plate 14 and meshed with the primary gear 12. A pump housing 17 which may be integral with the torque plate 14 encloses each gear pump to provide a hydraulic circuit between the inlet port 20 and the outlet port 21 in the torque plate 14. The inlet and outlet ports, such as shown at 20, 21, communicate through similar ports 22, 23 in the valve plate 30 and through similar ports 24, 25 in the wall 26 of the driven member 27. The driven member 27 is connected by splines 28 to the output shaft 29.

The torque plate 14 and the pump housing 17, which are formed as a single unit, are connected to the driven member 27 by at least one calibrated torque spring, such as shown at 31, and the arrangement is such as to permit limited relative rotation between the torque plate 14 and the driven member 27. When the torque plate 14 is in the position shown with the calibrated torque springs such as shown at 31 not compressed, the outlet ports 21 and 25 are completely misaligned and the hydraulic circuit for the gear pump completely restricted and is blocked to prevent rotation of the pump gear 15 and thus cause the torque pate 14 to rotate with the primary gear 12 and input shaft 10 with a direct drive ratio. Should the applied torque exceed a predetermined amount, the torque spring such as shown at 31 will be compressed to allow a limited relative rotation of the torque plate 14 and the driven member wall 26 to better align the outlet ports 21 and 25 and reduce the hydraulic circuit blockage or restriction to thereby permit the pump gear 15 to rotate and thus providing a gear reduction and torque multiplication between the input and output shafts.

The driven member 27 is preferably shaped to enclose a hydraulic fluid reservoir 35 surrounding the output shaft 29 and axially adjacent the torque plate 14 and gearing 12 and 15. A resilient tube 36 is contained internally of the reservoir 35 and is filled with a gas under pressure to provide pneumatic means for pressurizing the hydraulic fluid in the hydraulic circuit and thus compensate for expansion and contraction of the fluid by temperature variation.

An important feature of this invention is the provision of the previously described control valve plate 30 which may be adjusted by any suitable means, such as the threaded link 40 connecting the plate at 41 to the driven member 27. By adjusting the nut 42, the relative rotational position of the valve plate 30 with respect to the torque plate 14 and the driven member 27 may be adjustably predetermined to vary the restriction of outlet port passage formed by ports 21, 23, 25 for a given position of the torque plate corresponding to the amount of applied torque before the calibrated torque spring 31 is compressed. Thus, the maximum amount of torque that may be transmitted with a direct drive and without torque multiplication can be easily predetermined and controlled. It will be noted that each of the inlet ports, such as shown at 22, of the control plate is elongated so as to provide no restriction regardless of the relative positions of the valve plate 30, torque plate 14 and driven member wall 26. The inlet ports in the torque plate 14 and driven member wall 26 are also similarly formed to provide no restriction regardless of the relative rotational positions of the torque plate and driven member wall.

It should be understood that various arrangements for adjustably predetermining the relative position of the valve plate 30 other than the adjustable link 40 will occur to those skilled in the art and this invention is not to be limited to the particular link configuration shown.

What is claimed is:

1. A torque converter transmission comprising, an input shaft, an output shaft, a primary gear connected to said input shaft for rotation therewith, a rotatable torque responsive plate, at least one fluid pump gear means rotatably mounted on said torque plate and meshed with said primary gear to rotate said torque plate with said primary gear whenever said pump gear is restrained from rotation, a rotatable driven member connected to said output shaft for rotation therewith, at least one calibrated torque transmission spring connected between said torque plate and said driven member to permit limited relative rotation between said torque plate and said driven member, a hydraulic fluid reservoir, a hydraulic circuit having port means for each respective pump gear means and including inlet and outlet ports to supply fluid to and from said reservoir to be pumped by said pump means, said port means including apertures in said torque plate and said driven member arranged to variably restrict the outlet port depending on the torque responsive relative rotational positions of said torque plate and said driven member, and a control valve plate interposed in said hydraulic circuit and adjustably movable to control the restriction of each outlet port to be different for different torque responsive positions of said plate and thereby adjustably predetermined the maximum amount of input torque transmitted with direct drive between said input and output shafts.

2. The invention of claim 1 in which the axes of said input and output shafts are aligned and said torque plate and said driven member together with said valve plate are concentrically located around the axes of said input and output shafts.

3. The invention of claim 2 in which said reservoir and said valve plate are concentric to said output shaft and are axially adjacent said torque plate.

4. The invention of claim 2 in which said reservoir is formed within said driven member and is axially displaced from said torque plate with said valve plate interposed therebetween.

5. The invention of claim 1 in which said reservoir is provided with an internal pressure-equalizing elastic pneumatic member inflated with a gas under pressure.

6. The invention of claim 1 in which the inlet ports are arranged to be not restricted for any torque responsive position of said torque plate and the outlet ports are arranged to provide maximum restriction for the maximum direct drive torque responsive position of said torque plate.

7. A torque converter transmission comprising, an input shaft, an output shaft, a primary gear connected to said input shaft for rotation therewith, a rotatable torque responsive plate, at least one fluid pump gear means rotatably mounted on said torque plate and meshed with said primary gear to rotate said torque plate with said primary gear whenever said pump gear is restrained from rotation, a rotatable driven member connected to said output shaft for rotation therewith, at least one calibrated torque transmission spring connected between said torque plate and said driven member to permit limited relative rotation between said torque plate and said driven member, a hydraulic fluid reservoir, a hydraulic circuit having port means for each respective pump gear means and including inlet and outlet ports to supply fluid to and from said reservoir to be pumped by said pump means, said port means including apertures in said torque plate and said driven member arranged to variably restrict the outlet port depending on the torque responsive relative rotational positions of said torque plate and said driven member, and a pressure equalizing elastic pneumatic member inflated with gas under pressure and positioned within said reservoir to provide a regulation of the hydraulic pressure for said hydraulic fluid notwithstanding temperature variations.

* * * * *